US006665110B2

(12) United States Patent
Pettitt

(10) Patent No.: US 6,665,110 B2
(45) Date of Patent: Dec. 16, 2003

(54) DIAGONAL TO RECTANGULAR PIXEL MAPPING FOR SPATIAL LIGHT MODULATOR

(75) Inventor: Gregory S. Pettitt, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/335,391

(22) Filed: Dec. 31, 2002

(65) Prior Publication Data

US 2003/0133178 A1 Jul. 17, 2003

Related U.S. Application Data

(60) Provisional application No. 60/344,854, filed on Dec. 31, 2001.

(51) Int. Cl.[7] .................. G02B 26/00; H01L 28/82; G01C 19/00; G01P 15/00

(52) U.S. Cl. .............. 359/291; 359/290; 257/418; 257/420; 73/504.09; 73/504.02; 73/514.17
(58) Field of Search .................. 359/290, 291; 257/418, 420; 73/504.09, 504.02, 514.17

(56) References Cited

U.S. PATENT DOCUMENTS 6,278,542 B1 * 8/2001 Hewlett .............. 359/291
6,285,488 B1 * 9/2001 Sandstrom .......... 359/290

* cited by examiner

*Primary Examiner*—Hung Xuan Dang
*Assistant Examiner*—Jack Dinh
(74) *Attorney, Agent, or Firm*—Charles A. Brill; Wade James Brady, III; Frederick J. Telecky, Jr.

(57) ABSTRACT

A method of mapping diagonal rows and columns of two-dimensional grid elements to rectangular rows and columns of two-dimensional grid elements. The method is of particular use with a spatial light modulator in optical equalization application.

20 Claims, 4 Drawing Sheets

| u | v | x | y |
|---|---|---|---|
| -9 | 4 | 0 | 9 |
| -9 | 0 | -4 | 5 |
| -6 | 2 | -1 | 5 |
| 11 | 3 | 9 | -2 |
| -8 | 4 | 0 | 8 |
| 3 | -8 | -6 | -9 |

DIAGONAL TO RECTANGULAR PIXEL MAPPING FOR SPATIAL LIGHT MODULATOR

This application claims priority under 35 USC §119(e)(1) of provisional application No. 60/344,854 filed Dec. 31, 2001.

TECHNICAL FIELD OF THE INVENTION

This invention relates to spatial light modulators, and more particularly to a method of mapping between diagonal pixel control patterns and rectangular pixel control patterns.

BACKGROUND OF THE INVENTION

A Digital Micromirror Device™ (DMD™) is a type of microelectromechanical systems (MEMS) device. Invented in 1987 at Texas Instruments Incorporated, the DMD is a fast, reflective digital spatial light modulator. It can be combined with image processing, memory, a light source, and optics to form a digital light processing system capable of projecting large, bright, high-contrast color images. It may also be used for other applications, such as for optical switching and in optical equalization systems.

The DMD is fabricated using CMOS-like processes over a CMOS memory. It has an array of individually addressable mirror elements, each having an aluminum mirror that can reflect light in one of two directions depending on the state of an underlying memory cell. With the memory cell in a first state, the mirror rotates to +10 degrees. With the memory cell in a second state, the mirror rotates to −10 degrees. When the mirror surfaces are illuminated with a light source, the mirrors in the array can be set to one state or the other, such that "on" mirrors reflect light to one location and "off" mirrors reflect light to another location.

This on or off capability of the mirror elements has led to numerous applications for DMDs. For imaging applications, the "on" mirror elements reflect light to an image plane. For optical switching applications, the mirror positions can be used to direct a beam of light to a given output path. Another application is for optical equalization, where input wavelengths are directed to different portions of the DMD array, and each wavelength is selectively attenuated so that the outputs are equalized.

The DMD architecture is such that the rotation of each mirror element is along the diagonal of the mirror. Because of this, the mirror surfaces are illuminated along their diagonals.

Thus, when the DMD is used for optical equalization, the input signal illuminates the DMD mirror surfaces along the mirror diagonals. As a result, pixel control patterns are along diagonal paths. This requires the control values to be mapped to the rectangular control architecture of the DMD pixel array.

SUMMARY OF THE INVENTION

One aspect of the invention is a method of using a spatial light modulator (SLM) to control the gain of an input optical signal. The gain control achieved by determining a two-dimensional grid of values, each value representing an on or off position of pixel elements of the SLM. A is u,v space is defined for the diagonal rows and columns, such that the u axis and v axis run through diagonals of each grid element. Each grid element is assigned a u,v coordinate pair. For each grid element in the u,v space, an x,y coordinate pair is calculated by performing the following operation:

$$\begin{bmatrix} x \\ y \end{bmatrix} = int\left(\begin{bmatrix} 0.5 & 1 \\ -0.5 & 1 \end{bmatrix} \cdot \begin{bmatrix} u \\ v \end{bmatrix} + \begin{bmatrix} 0.5 \\ 0.5 \end{bmatrix}\right)$$

Each non-integer value is then rounded to an adjacent pixel value. For example, the next smallest integer value, int (8.5)=8 and int (−9.5)=−10.

An advantage of the invention is that it provides a means to describe pixel control values in diagonal pixel space, then translate the results onto the rectangular space of the SLM. The conventional alternative is to work in rectangular space, then use complex mathematical operations to rotate pixel control values.

DETAILED DESCRIPTION OF THE INVENTION

Figure 1:
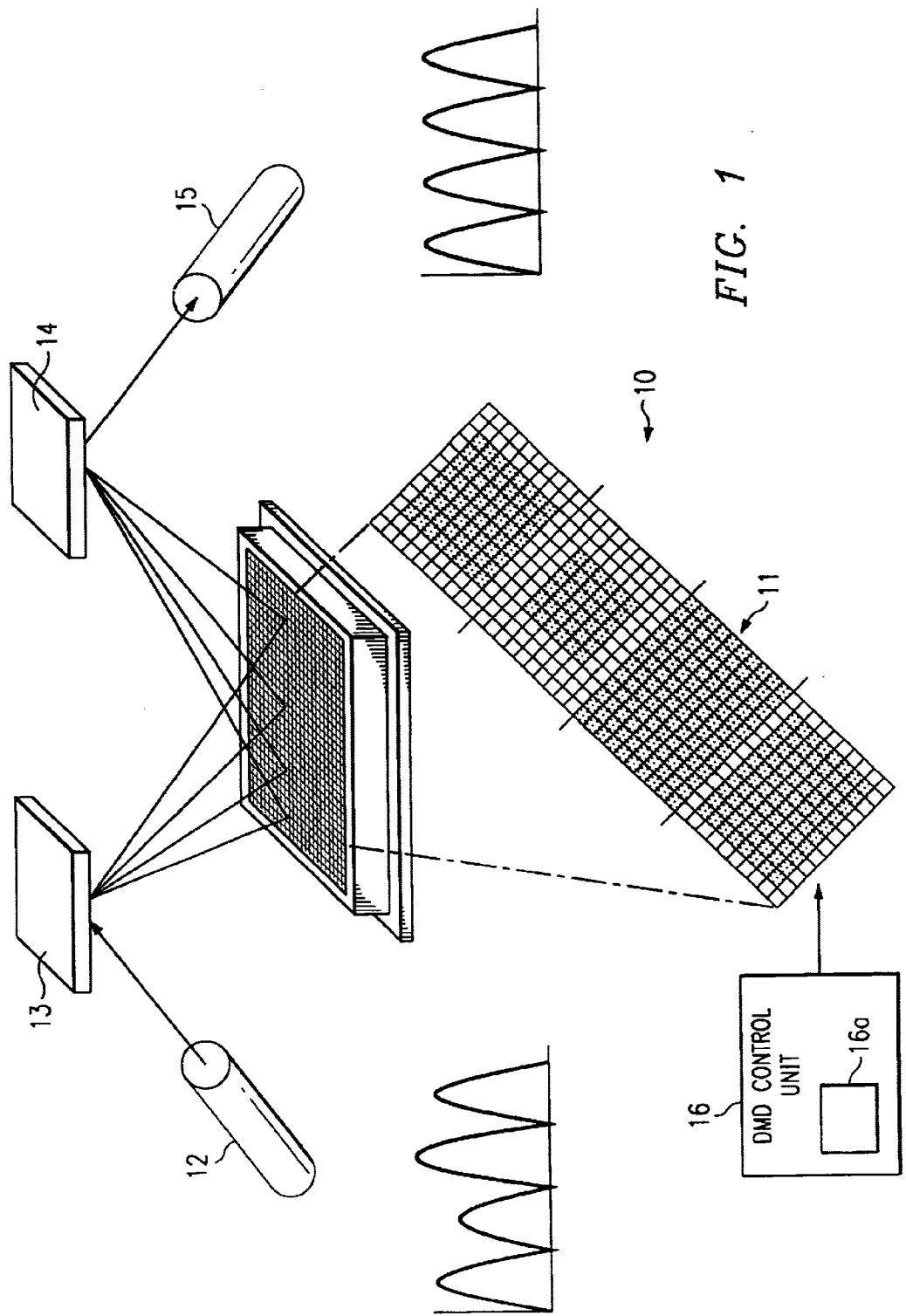
FIG. 1 illustrates a DMD-based optical equalization system having a DMD that operates in accordance with the invention.

FIG. 1 illustrates a DMD-based optical equalizer system, having a DMD 11 that operates in accordance with the invention. As illustrated, an input fiber 12 directs an optical signal to a first grating 13. Grating 13 spreads the signal diagonally across the DMD 11, with different wavelengths reaching different portions of DMD 11. The DMD 11 equalizes the wavelength components of the signal. As explained below, the equalization is accomplished when the DMD portion associated with each wavelength reflects only a predetermined amount of that wavelength as determined by the number of mirror elements that are "on". The optical signal is reflected from DMD 11 to a second grating 14, which realigns the components and directs the signal to an output fiber 15.

Although various equalization schemes are possible, in general, the DMD operates by attenuating each wavelength component a desired amount, so that stronger signals are attenuated more and weaker signals are attenuated less, with the result being that the output signals have substantially equal intensity. A specific portion of the DMD array is associated with each input wavelength component. If all mirror elements of that portion are "on" the signal is not attenuated. If some portion of the mirror elements of that portion are "off", the signal is attenuated.

A DMD control unit 16 implements the various operational functions for DMD 11, such as setting the mirror elements to their on or off positions. A diagonal to rectangular mapping unit 16a implements the method described herein. Apart from the mapping functions of mapping unit 16a, the general aspects of DMD operation are described in various publications and patents.

Figure 2:
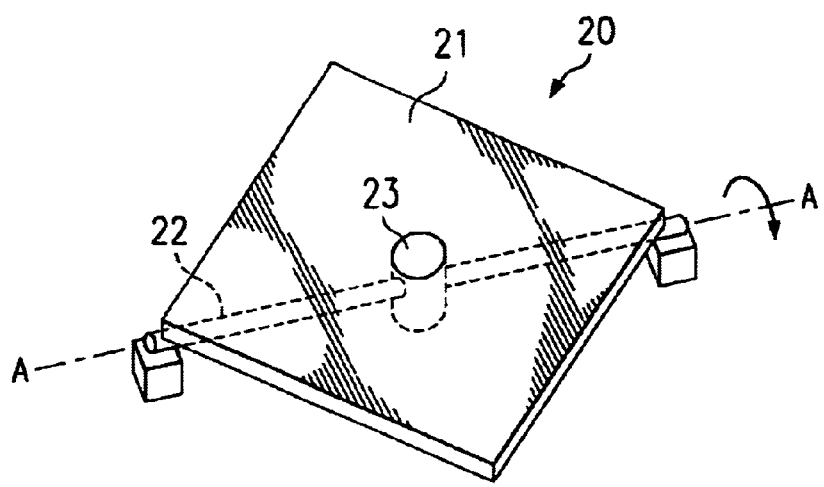
FIG. 2 illustrates the mirror and hinge elements of a single mirror element of the DMD of FIG. 1.

FIG. 2 illustrates the mirror 21 and hinge 22 of one mirror element 20 of DMD 11. Only those upper portions of a single DMD mirror element are shown; each mirror element has other components not shown, such as addressing electrodes and bias circuitry, underlying the mirror 11. For purposes of this description, the mirror elements are also referred to as "pixels".

Each mirror 21 is mounted over a torsion hinge 22, typically by means of a hinge support post 23. Hinge 22 permits the mirror 21 to tilt. Each mirror 21 is further individually addressable by means of applied electrostatic forces, and tilts in response to address signals. As illustrated, each mirror 21 tilts with an axis of rotation along its diagonal.

Because of the diagonal tilt of mirror 11, the mirror 11 is illuminated diagonally. Thus, as stated above, the grating 13 spreads the wavelength components along the diagonal of the surface of the DMD 11.

Because of the diagonal line paths of the optical input, the mirrors 21 are controlled along diagonal line paths. This permits the gain of equalizer 10 to be controlled for each wavelength. More specifically, gain control is accomplished by using a diagonal masking function, which is a two-dimensional grid of values. Each value in the grid is associated with a mirror element, and ultimately determines whether that mirror element will be on or off.

Figure 3:
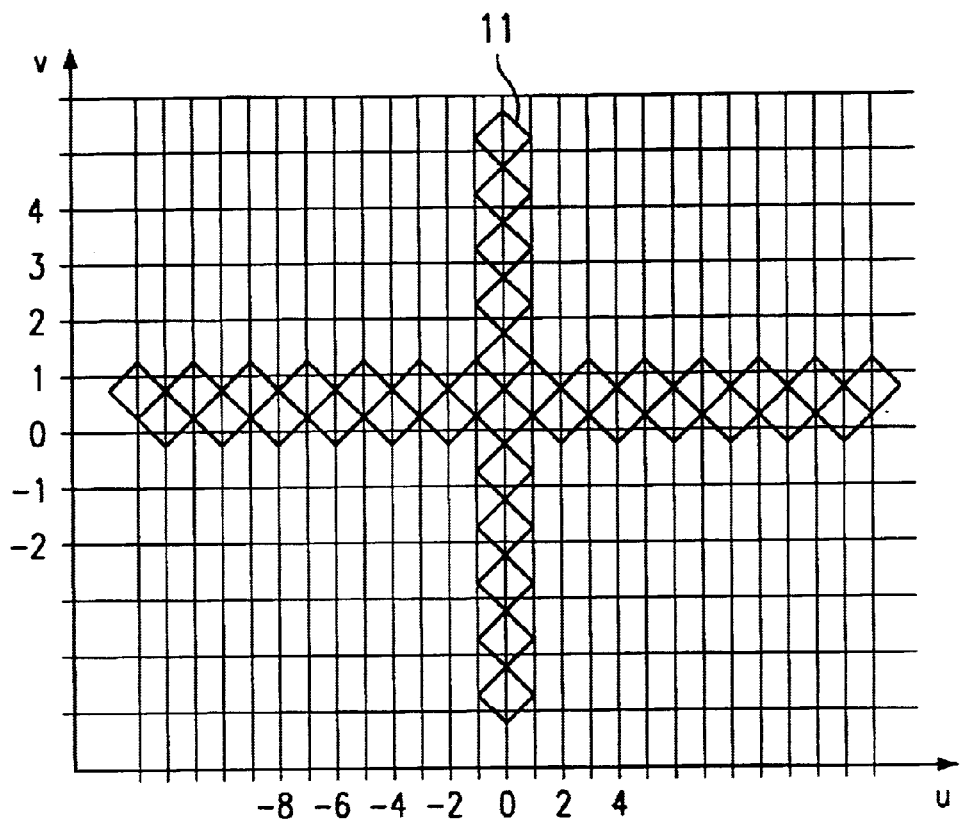
FIG. 3 illustrates diagonal pixel paths of the DMD mapped to a u,v space.

FIG. 3 illustrates a two-dimensional space, (u,v), having diagonal pixel coordinates in accordance with the invention. As explained below, the method described herein defines a new u,v space with diagonal pixel coordinates that maps to a conventional x,y space with rectangular pixel coordinates. The mapping of pixel coordinates permits a two-dimensional grid of pixel control values to be mapped from diagonal paths to rectangular rows and columns.

The method is directed to DMDs and their diagonal illumination. However, the method could also be applied to other spatial light modulators (SLMs) that are controlled along diagonal paths of pixel elements.

In the example of this description, each value describes a thresholding weight of a mirror element. Depending on whether the threshold is exceeded, the mirror is set to either an on or off position. Various other equalization schemes are possible. For example, the pixel patterns could be simply a pattern of 1's and 0's representing on or off mirror positions.

The most convenient way to describe and store the masking function is as a rectangular grid. This presents the problem of translating the masking function, which represents diagonal mirrors onto the rectangular space of the DMD.

In FIG. 3, the u,v space is shown with diagonal paths of mirror elements (pixels) of DMD 11 rotated and mapped onto the space. As illustrated, the horizontal and vertical tick lines of the u,v space run through the diagonals of the pixels and the u axis counts along a zig zag row of pixels. Thus, one column and one row of pixels are shown mapped onto the u,v space.

Figures 4, 5, 6, 7, 8:
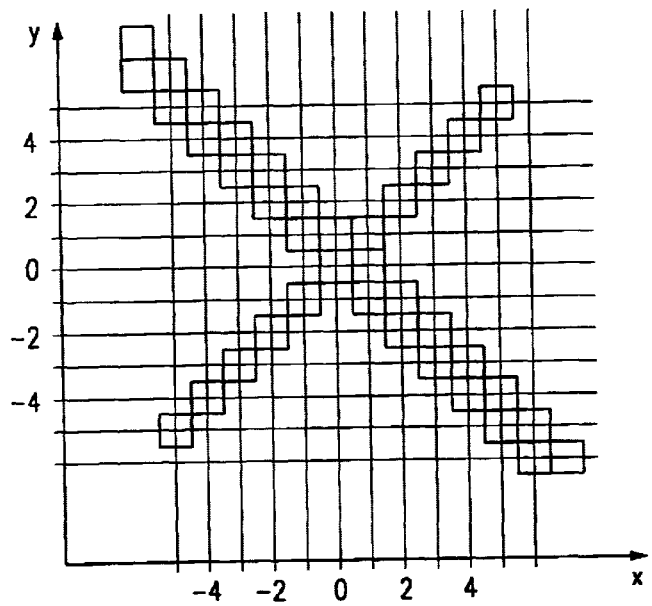
FIG. 4 illustrates the diagonal pixel paths of FIG. 3 mapped to rectangular paths of an x,y space.
FIG. 5 illustrates an example of equivalent pixel coordinates in the u,v and x,y spaces.
FIGS. 6–8 illustrate three examples of u,v coordinates and associated pixel control values.

FIG. 4 illustrates the same pixels as shown in FIG. 3, but mapped onto the (x,y) plane of DMD 11. The zig zag row of pixels from FIG. 3 is considered as being at v=0. Along the u axis, each pixel of the zig zag row is one unit.

The mapping from u,v space to x,y space is accomplished using the following equation:

$$\begin{bmatrix} x \\ y \end{bmatrix} = \text{int}\left( \begin{bmatrix} 0.5 & 1 \\ -0.5 & 1 \end{bmatrix} \cdot \begin{bmatrix} u \\ v \end{bmatrix} + \begin{bmatrix} 0.5 \\ 0.5 \end{bmatrix} \right),$$

where int(x) represents a rounding down to the next smallest integer.

Mapping from x,y space to u,v space can be accomplished using a similar equation:

$$\begin{bmatrix} u \\ v \end{bmatrix} = \text{int}\left( \begin{bmatrix} 1 & -1 \\ 0.5 & 0.5 \end{bmatrix} \cdot \begin{bmatrix} x \\ y \end{bmatrix} + \begin{bmatrix} 0.5 \\ 0.5 \end{bmatrix} \right),$$

where int(x) represents a rounding down to the next smallest integer.

Referring again to FIG. 1, the above-described mapping functions may be easily implemented using logic circuitry 16a, including hardware or processor-run software. The operations for performing the mapping functions include shifts, adds, and bit masks.

FIG. 5 is a table that sets out equivalent coordinates in x,y and u,v space. Using the mapping functions, a rectangular grid of numbers described in diagonal (u,v) space can be mapped onto rectangular (x,y) space.

Figure 9:
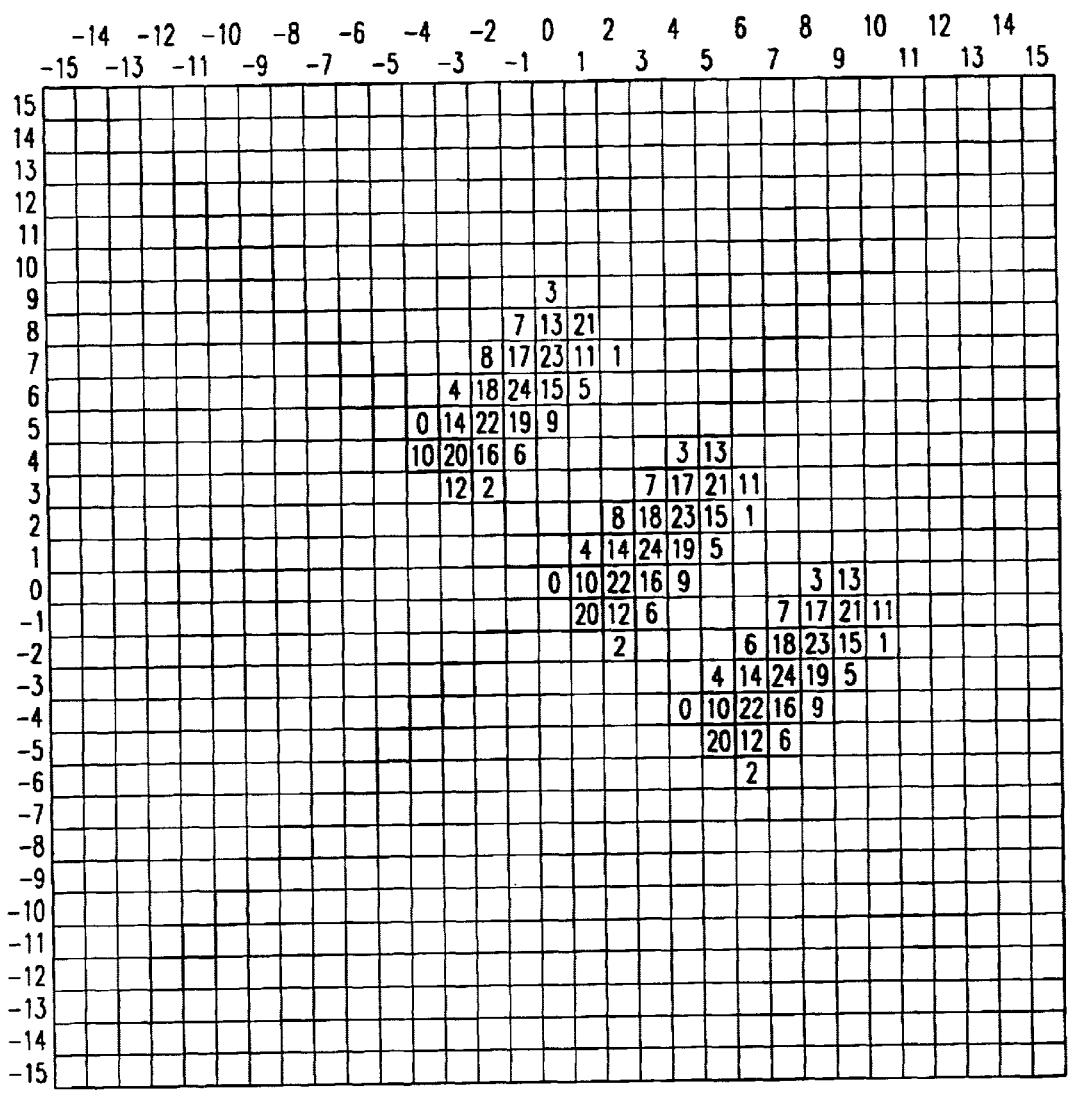
FIG. 9 illustrates the pixel control values of FIGS. 6–8 mapped to an x,y space.

FIGS. 6–8 illustrate three examples of u,v coordinates. Each pair of u,v coordinates has a corresponding pixel control value. FIG. 9 illustrates the results of the mapping.

The mapping method of the invention permits computations and masks to be stored in rectangular formats, then transformed to the rectangular space of the DMD array. Each entry in the mask maps one-to-one to a location in the DMD space, thereby ensuring that no pixels are missed or uncontrollable.

Other Embodiments

Although the present invention has been described in detail, it should be understood that various changes, substitutions, and alterations can be made hereto without departing from the spirit and scope of the invention as defined by the appended claims.

What is claimed is:

1. A method of mapping diagonal rows and columns of two-dimensional grid elements to rectangular rows and columns of two-dimensional grid elements, comprising the steps of:

defining a u,v space for the diagonal rows and columns, such that the u axis and v axis run through diagonals of each grid element;

assigning a u,v coordinate pair for each grid element;

for each grid element in the u,v space, calculating an x,y coordinate pair, by performing the following operation:

$$\begin{bmatrix} x \\ y \end{bmatrix} = int\left( \begin{bmatrix} 0.5 & 1 \\ -0.5 & 1 \end{bmatrix} \cdot \begin{bmatrix} u \\ v \end{bmatrix} + \begin{bmatrix} 0.5 \\ 0.5 \end{bmatrix} \right)$$

and;

for each non-integer value, rounding to an adjacent integer value.

2. The method of claim 1, wherein each coordinate pair has an associated value, and further comprising the step of assigning each value associated with a u,v coordinate pair with an x,y coordinate pair as determined by the calculating step.

3. The method of claim 1, wherein the method is used to map diagonal pixel control patterns to rectangular pixel control patterns of a spatial light modulator.

4. The method of claim 3, wherein the spatial light modulator is a digital micro-mirror device.

5. The method of claim 1, wherein the calculating step is performed with a processor and software executed by the processor.

6. The method of claim 1, wherein the calculating step is performed with hardware circuitry.

7. A method of using a spatial light modulator (SLM) to control the gain of an input optical signal, comprising the steps of:

determining a two-dimensional grid of values, each value representing an on or off position of pixel elements of the SLM;

defining a u,v space for the diagonal rows and columns, such that the u axis and v axis run through diagonals of each grid element;

assigning a u,v coordinate pair for each grid element;

for each grid element in the u,v space, calculating an x,y coordinate pair, by performing the following operation:

$$\begin{bmatrix} x \\ y \end{bmatrix} = int\left( \begin{bmatrix} 0.5 & 1 \\ -0.5 & 1 \end{bmatrix} \cdot \begin{bmatrix} u \\ v \end{bmatrix} + \begin{bmatrix} 0.5 \\ 0.5 \end{bmatrix} \right)$$

and;

for each non-integer value, rounding to an adjacent integer value.

8. The method of claim 7, wherein each coordinate pair has an associated value, and further comprising the step of assigning each value associated with a u,v coordinate pair with an x,y coordinate pair as determined by the calculating step.

9. The method of claim 8, wherein the method is used to map diagonal pixel control patterns to rectangular pixel control patterns of a spatial light modulator.

10. The method of claim 9, wherein the spatial light modulator is a digital micro-mirror device.

11. The method of claim 8, wherein the calculating step is performed with a processor and software executed by the processor.

12. The method of claim 8, wherein the calculating step is performed with hardware circuitry.

13. The method of claim 7, wherein the two dimensional grid of values is a grid of binary values.

14. The method of claim 7, wherein the two dimensional grid of values is a grid of threshold values.

15. A method of mapping rectangular rows and columns of two-dimensional grid elements to diagonal rows and columns of two-dimensional grid elements, comprising the steps of:

defining a u,v space for the diagonal rows and columns, such that the u axis and v axis run through diagonals of each grid element;

assigning a u,v coordinate pair for each grid element;

for each grid element in the u,v space, calculating an x,y coordinate pair, by performing the following operation:

$$\begin{bmatrix} u \\ v \end{bmatrix} = int\left( \begin{bmatrix} 1 & -1 \\ 0.5 & 0.5 \end{bmatrix} \cdot \begin{bmatrix} x \\ y \end{bmatrix} + \begin{bmatrix} 0.5 \\ 0.5 \end{bmatrix} \right),$$

and;

for each non-integer value, rounding to an adjacent integer value.

16. The method of claim 15, wherein each coordinate pair has an associated value, and further comprising the step of assigning each value associated with a u,v coordinate pair with an x,y coordinate pair as determined by the calculating step.

17. The method of claim 15, wherein the method is used to map diagonal pixel control patterns to rectangular pixel control patterns of a spatial light modulator.

18. The method of claim 17, wherein the spatial light modulator is a digital micro-mirror device.

19. The method of claim 15, wherein the calculating step is performed with a processor and software executed by the processor.

20. The method of claim 15, wherein the calculating step is performed with hardware circuitry.

* * * * *